June 16, 1925.
J. C. MOORE
1,542,261
ELECTRIC GENERATOR CIRCUIT
Filed Oct. 10, 1923
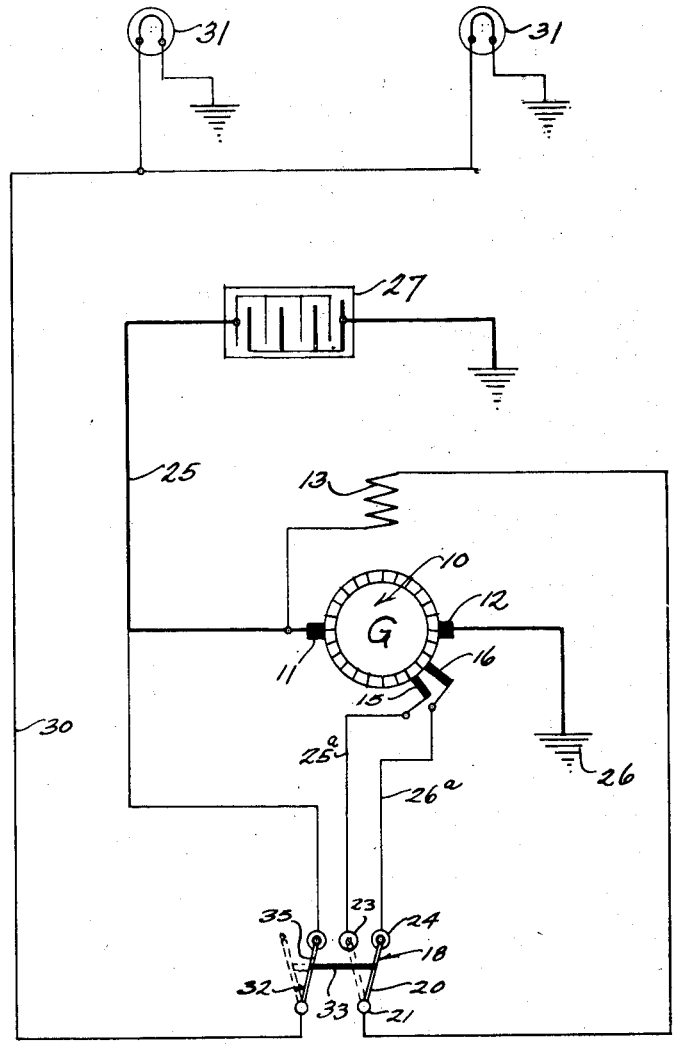
Inventor
Jay C. Moore.

Patented June 16, 1925.

1,542,261

UNITED STATES PATENT OFFICE.

JAY C. MOORE, OF FREDONIA, PENNSYLVANIA.

ELECTRIC GENERATOR CIRCUIT.

Application filed October 10, 1923. Serial No. 667,718.

*To all whom it may concern:*

Be it known that I, JAY C. MOORE, a citizen of the United States, residing at Fredonia, in the county of Mercer and State of Pennsylvania, have invented certain new and useful Improvements in an Electric Generator Circuit, of which the following is a specification.

This invention relates to improvements in electric generator circuits.

The primary object of this invention is the provision of a novel practical means for varying the flux of the magnetic field of a generator.

A further and important object of this invention is the provision of a novel generator circuit which may be used in connection with the operation of ignition and lighting circuits of motor vehicles, embodying a novel means for varying the field connections of the generator, by means of the switch mechanism which controls the lighting circuit of the motor vehicle.

A further object of this invention is the provision of a novel generator circuit of the above mentioned character which may be selectively used so that the generator thereof will produce a low charging rate during day time driving of the vehicle, and automatically increase the charging rate when it is necessary to utilize the lights of the vehicle, such as during night driving.

A further object of this invention is the provision of a novel type of generator in which the field thereof is shunt wound, and which is capable of producing a variable flux.

Other objects and advantages of this invention will be apparent during the course of the following detailed description.

In the drawing, wherein similar reference characters designate corresponding parts, and wherein for the purpose of illustration is shown but the preferred embodiment of this invention, the view diagrammatically illustrates the electrical generator circuit as used in connection with ignition and lighting circuits.

In the drawing, the numeral 10 designates a generator, which may include main brushes 11 and 12 operating on the commutator portion thereof. The generator 10 is preferably of the shunt wound type, in which the field thereof is provided with a shunt circuit 13. The shunt circuit 13 may be connected to the positive brush 11 of the generator 10, or adjacent thereto, and the other end of the shunt circuit may have connection with the generator through brushes 15 and 16, which may operate on the commutator portion of the generator 10, and either of which brushes 15 and 16 may be used in the shunt field winding, the selection of the brush to be so used being accomplished by means of a switch mechanism 18. In connection with this feature of the shunt field winding, it is to be noted that the brushes 15 and 16 are carried in spaced relation, by any approved construction (not shown), and of course contact the generator commutator at spaced points between the main collector brushes 11 and 12. It is a well known principle of generator construction that an adjustable brush provided for the shunt field winding of the generator will enable the flux of the field magnet to be controlled according to a desired condition. Applying the principle by means of which the regulation of the generator is accomplished by the third brush excitation to this invention, it is to be noted that when the shunt circuit 13 of the field winding has the auxiliary brush 16 thereof in circuit therewith, the magnetic flux in the field magnet will be greater than when the brush 15 is in the shunt field winding circuit. As before mentioned, the selective disposal of the brushes 15 and 16 in the shunt field circuit is accomplished by means of a switch structure 18, which may include a switch arm 20 pivoted, as at 21, and adjacent which pivot point 21 is a connection for the main portion of the shunt circuit 13. The arm 20, of course, is a conductor, and may be pivoted to selectively engage contacts 23 and 24, which are respectively connected, as by wires 25ª and 26ª, to the brushes 15 and 16.

The generator 10, and the novel shunt field connections therefor, as used in connection with the electric system of an automotive vehicle, contemplates that the generator collector brush 11 shall be directly connected in the main battery circuit 25 of the automotive vehicle, grounding the brush 12, as at 26. The battery circuit 25 may include any of the ordinary apparatus, and preferably has the battery 27 located therein in the conventional manner, and which may be charged by electro-motive force generated by the generator 10. The electrical system of the motor vehicle may also include a circuit 30, which may be called the lighting circuit, and within which any approved lights 31 may be located, such as are generally used in connection with motor vehicle lighting systems. This circuit 30 has a connection with the main battery circuit 25, although between this connection and the lights 31, a switch structure 32 is provided, which when closed places the lighting circuit 30 so that it may receive current from the battery 27, or generator 10, and which when open will cut off the lights or lamps 31 from the reception of any current. The switch structure 32 is preferably connected to the switch structure 18 above mentioned, as by an insulating bar 33, which may be pivotally connected to the arms 20 and 35 of the switch structures 18 and 32 respectively, for simultaneous operation thereof.

In operation, when the switch arm 35 is in opened position with respect to the lighting circuit 30, as is illustrated by the dotted lines in the drawings, the switch arm 20 will be positioned so that the brush 15 of the generator 10 is connected in the shunt field winding, and controls the strength of the magnetic field. This relation of parts is kept during daytime driving, or when it is not desired to use the lights on the vehicle. However, for night time driving, or when it is desired to use the lamp lights of the vehicle, the switch 32 which controls the lighting circuit 30 will be closed. Incident to connection of the switch arm 20 to the switch arm 35, by means of the insulating bar 33, such moving of the lighting switch 32 to a closed position will automatically throw the switch arm 20 into engagement with the contact 24 of the shunt field winding, so that the connection of the brush 15 therein is broken, and the brush 16 is placed in connection in the shunt field winding. This operation increases the strength of the magnetic field flux, and as will be well understood by those skilled in the art to which this invention relates, the generator will produce a greater voltage.

The advantages of the novel principle of generator construction herein outlined is apparent, since thereby the charging rate of the generator 10 may be varied for daytime and night time driving, independent of the whim of the operator; it being automatically taken care of by the position of the lighting switch.

Various structural refinements are contemplated in connection with the application of the system herein outlined to a generator, and changes in the shape, size, and arrangement of parts may be made to the form of the invention herein diagrammatically illustrated, without departing from the spirit of this invention or the scope of the claims.

I claim:

1. In combination with an electric system for motor vehicles including a battery circuit and a lighting circuit, a generator including a commutator and main collector brushes operatively disposed in the battery circuit, a shunt field winding circuit for the generator including a plurality of brushes operatively connected on the commutator of the generator, switch means for selectively placing any of the last mentioned brushes in said shunt field winding circuit, and a switch for the lighting circuit operatively connected to the first mentioned switch.

2. In a device of the class described the combination with the main battery circuit and a lighting circuit connected to said battery circuit, the lighting circuit having an independent operating switch therein, a generator including main brushes operatively connected in said battery circuit, a shunt field winding circuit for the generator including a plurality of brushes operating on the commutator of said generator, a switch for said shunt field winding circuit capable of being shifted to place either of the last mentioned brushes in closed relation in said shunt field winding circuit to vary the magnetic flux of the same, and means connecting the switch of the lighting circuit and the switch of the shunt field winding circuit for synchronous operation whereby upon closing the switch of the lighting circuit the switch of the shunt field winding circuit will be shifted from its connection with one of the last mentioned plurality of brushes to another of said last mentioned plurality of brushes for the purpose of increasing the magnetic flux in said shunt field winding circuit.

JAY C. MOORE.